United States Patent [19]
Cornelius

[11] 3,969,531
[45] July 13, 1976

[54] METHOD FOR DISPENSING A SEMI-FROZEN COMESTIBLE

[75] Inventor: Richard T. Cornelius, Minneapolis, Minn.

[73] Assignee: The Cornelius Company

[22] Filed: Aug. 14, 1974

[21] Appl. No.: 497,298

Related U.S. Application Data

[60] Continuation of Ser. No. 165,975, July 26, 1971, abandoned, which is a division of Ser. No. 866,861, Oct. 16, 1969, Pat. No. 3,642,174.

[52] U.S. Cl. ............... 426/319; 426/524; 426/565; 426/567; 62/69
[51] Int. Cl.² .............. A23G 9/20; A23G 9/16; A23G 9/28
[58] Field of Search .......... 426/316, 319, 524, 164, 426/366, 565, 567; 62/66, 69, 136

[56] References Cited
UNITED STATES PATENTS

| | | | |
|---|---|---|---|
| 2,290,214 | 7/1942 | Smith, Jr. | 99/136 |
| 2,713,253 | 7/1955 | Chandler | 99/136 |
| 3,220,204 | 11/1965 | Adler et al. | 99/192 |
| 3,256,100 | 6/1966 | Bernstein et al. | 99/136 |
| 3,477,244 | 11/1969 | Scoggins | 99/136 |
| 3,479,835 | 11/1969 | Lane et al. | 62/69 |
| 3,503,757 | 2/1970 | Rubenstein | 426/319 |

Primary Examiner—Curtis P. Ribando
Attorney, Agent, or Firm—Hill, Gross, Simpson, Van Santen, Steadman, Chiara & Simpson

[57] ABSTRACT

A process is provided in which a regulated flow of water is refrigerated, and a source of concentrated orange juice at atmospheric pressure is also refrigerated and is metered and combined with the water under pressure in a refrigerated blending and storage device along with nitrous oxide gas, and the resulting mixture is transferred to a separate freezing chamber where water is frozen from the mixture as pure ice. The mixture is dispensed from the freezing chamber to atmospheric pressure so that the nitrous oxide gas breaks out of the semi-frozen produce to render it fluffy.

5 Claims, 1 Drawing Figure

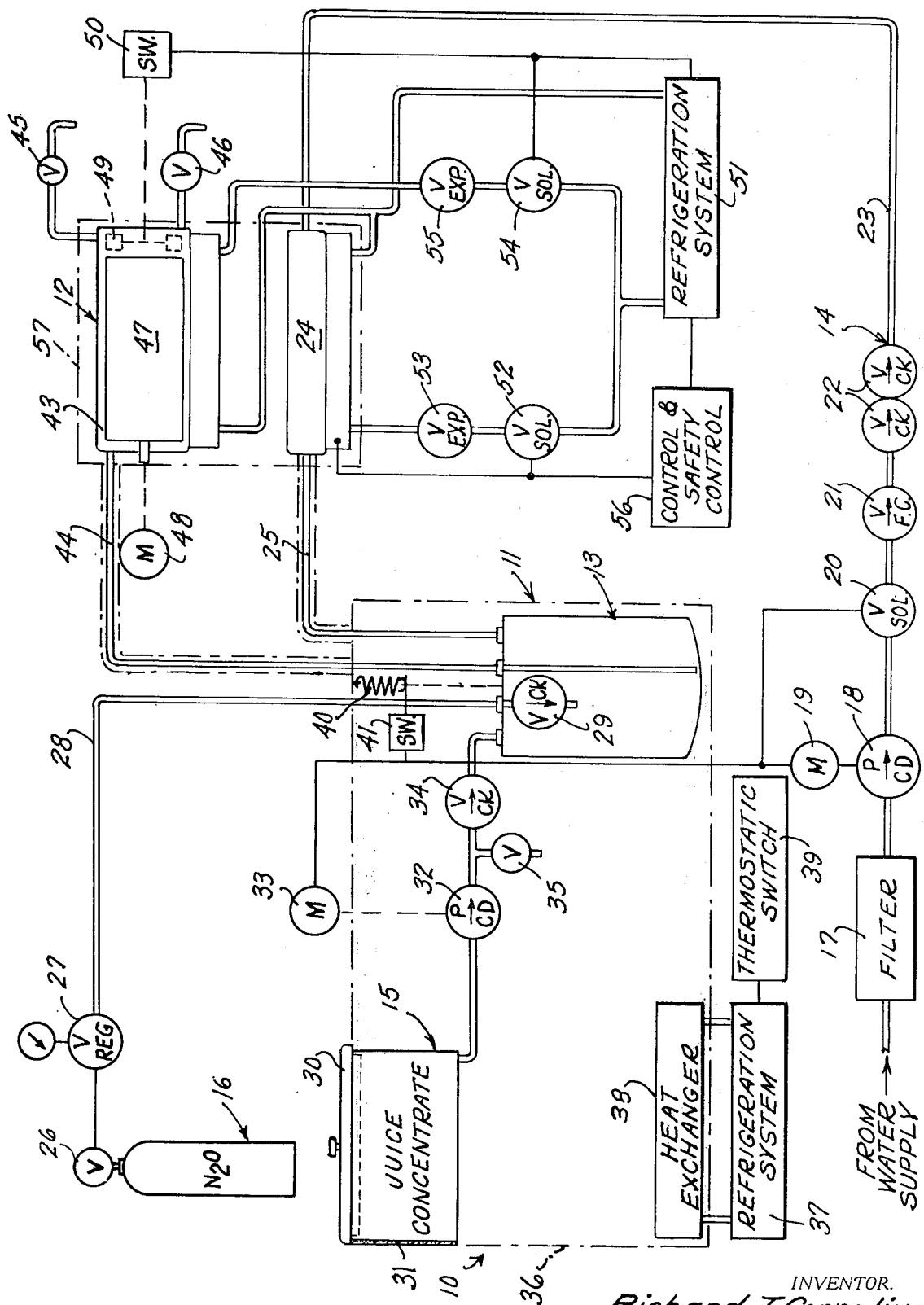

METHOD FOR DISPENSING A SEMI-FROZEN COMESTIBLE

This is a continuation of application Ser. No. 165,975, filed July 26, 1971, now abandoned, which is a division of Ser. No. 866,861 filed Oct. 16, 1969 now U.S. Pat. No. 3,642,174.

BACKGROUND OF THE INVENTION

1. Field of the Invention

This invention relates to a method for producing and dispensing a semi-frozen comestible, made from an unfrozen concentrate of the comestible containing sugar, for example, concentrated natural fruit juice such as orange juice.

2. Prior Art

Heretofore, it has been known to add water to concentrated orange juice, to refrigerate the same and to dispense the same. It has also been known to refrigerate a beverage which is a flavored sugar solution until some ice forms therein and to dispense the same, all under atmospheric pressure. It has also been known to carry out the same process using a carbonated beverage under pressure, such as the well known brands of cola beverage. From a commercialization standpoint, one difficulty with these last two methods is that they deal basically with a confection rather than with a nutritious food, thereby meeting commercial resistance from dieticians, school authorities and the like. If one were to merely freeze orange juice until it had some ice in it, the resulting product would lack the consumer appeal of a semi-frozen carbonated beverage. On the other hand, if one were to substitute orange juice for cola syrup in a semi-frozen carbonated beverage system, problems would arise since such systems do not employ refrigerated storage for the syrup and further the syrup is stored under pressure making it difficult or impossible for the operator to add additional concentrate without depressurization.

SUMMARY OF THE INVENTION

In this invention, concentrated comestible such as orange juice is stored at atmospheric pressure under refrigeration and is thereafter reconstituted by the addition of water. Such reconstituting is done by admixing the desired proportion of ingredients in an atmosphere of food-grade gas such as nitrous oxide that is soluble in the liquid. The amount of concentrate used in such admixing is carefully metered and the amount of water used is governed by a flow-rate control valve whereby the admixing is carried out under pressure. The mixture is thereafter further refrigerated in a separate freezing chamber to form ice therein, and on dispensing, the nitrous oxide breaks out of the semi-frozen comestible and in doing so renders the semi-frozen comestible fluffy, without having imparted any significant flavor thereto and without consitituting any adulterant therein.

Accordingly, it is an object of the present invention to provide a process for dispensing a semi-frozen comestible made from an unfrozen concentrate of the comestible which is stored at atmospheric pressure.

Another object of the present invention is to provide a method of preparing concentrated orange juice for consumption in a particular appetizing form.

A further object of the present invention is to provide a method for processing and dispensing concentrated orange juice without having any adulterant in the resulting product.

A still further object of the present invention is to provide a process for reconstituting a concentrated comestible in a semi-frozen and fluffy form.

Many other advantages, features and additional object of the present invention will become manifest to those versed in the art upon making reference to the detailed description and the accompanying sheet of drawings in which a preferred structural embodiment incorporating the principles of the present invention is shown by way of illustrative example.

ON THE DRAWING

The drawing is a diagrammatic view of a system for preparing and dispensing a semi-frozen comestible embodying the process steps of the present invention.

AS SHOWN ON THE DRAWING

The principles of the present invention are particularly useful when embodied in a juice dispensing system such as shown in the drawing, generally indicated by the numeral 10. The system 10 includes a storage source 11 of the product to be partially frozen and a freezing and dispensing cylinder 12. The storage source 11 includes a blending and storage device 13 to which is connected a source of water 14 and a source of concentrated comestible or concentrated juice 15 and a source of food-grade gas 16 such as nitrous oxide.

The source of water 14 is connected to a conventional supply of water which is normally treated by a filter 17 and then delivered at a controlled pressure by a constant delivery pump 18 that is driven by a motor 19, the output of the pump 18 being under the further control of a solenoid valve 20, and an adjustable flow-rate control valve 21. A double check valve 22, 22 leads from the flow control valve through a line 23 to a refrigerated precool plate 24 and through an insulated line 25 to the inlet of the blending and storage device 13.

The source of gas 16 comprises a conventional cylinder that has a shut-off valve 26 which leads to an adjustable pressure regulator valve 27 and then through a line 28 and through a check valve 29 of the snifter valve type to discharge into the interior of the blending and storage device 13.

The source of concentrated comestible or juice concentrate 15 is a container that is disposed for ready access, the interior of which is at atmospheric pressure. It has an opening in the top thereof closed by a manually removable cover 30, and at one end it has a sight glass 31 or equivalent means enabling the operator to know the amount of concentrate contained therein. The source of concentrated comestible 15 is connected by a proportioning pump 32 of the metering type which is driven by a motor 33, the pump leading through a check valve 34 to another inlet of the blending and storage device 13. A sampling valve 35 is provided downstream of the pump 32 to enable it to be used for drawing off samples of concentrate for verifying the rate of delivery of the pump 32. It is also used in connection with priming such pump and may be used in connection with draining the source 15. The source of concentrated comestible 15 and the blending and storage device 13 are disposed within a refrigerated system 37 that includes a heat exchanger 38 in the chamber 36. The refrigeration system 37 is under the control of a thermostatic switch 39 which senses the temperature inside the chamber 36.

The blending and storage device 13 is vertically movable and is in part supported by a spring 40. When the amount of mixture in the blending and storage device 13 has reached a lower limit, the blending and storage device 13 rises sufficiently to actuate a switch 41 which is connected to turn on the concentrate pump motor 33, the water pump motor 19 and the water solenoid 20. When sufficient concentrate and water have entered the blending and storage device 13, the switch 41 terminates the filling operation.

The freezing cylinder 12 has an internal chamber 43 which is connected by an insulated line 44 to the outlet of the blending and storage device 13. A combined automatic relief valve and manual vent valve 45 is connected to the upper part of the chamber 43 to enable complete filling of the chamber 43. A somewhat larger dispensing valve 46 is connected to the lower part of the chamber 43. The valve 46 is of a known type which agitates the product as much as possible during dispensing. The product is agitated by a combined scraper and stirrer 47 driven by a continuously operating motor 48. The proportion of ice that has been frozen out of the mixture is determined by a pivotably supported drag sensing element 49 that is connected to operate a switch 50. A second refrigeration system 51 has an outlet that is divided, one branch being under the control of a solenoid valve 52 and an expansion valve 53 while the other branch is under the control of a solenoid valve 54 and an expansion valve 55. The expansion valve 53 brings refrigerant to the precool plate 24 and the expansion valve 55 brings refrigeration to the freezing cylinder 12. The switch 50 is connected to control the solenoid valve 54 and the refrigeration system 51, while a control switch 56 is connected to sense the temperature of the precool plate 24 for controlling the solenoid valve 52 and the refrigeration system 51. The control 56 includes a secondary control as a safety to shut the system down in the event that freezing of water in the precool plate 24 becomes imminent. If desired, various other controls and interlocks can be provided as is known in the refrigeration and dispensing art. The chain line 57 denotes insulation for the freezing chamber 12 and the precool plate 24.

The control 56 is normally set so that water discharging from the precool plate 24 through the line 25 will have a temperature on the order of 34 F. The thermostatic switch 39 is set to about this same value so that the temperature in the chamber 36 should be between 33 and 35 F. An adjustment on the switch 50 (not shown, but conventional) is set so that when the product in the chamber 43 has about 60% ice, it will provide sufficient drag to enable the switch 50 to close the solenoid valve 54. Such a percentage of ice will be obtained when a temperature of about 25 F is reached in the chamber 43.

The motor 48 has an output on the order of 125 rpm which is the rotational speed of the combined scraper-stirrer 47. The example given as to percentage ice and temperature in the chamber 43 is based on the adjustable flow control valve's 21 being set to deliver a flow rate which is exactly four times that of the metered rate provided by the pump 32, and is further based on the use of a concentrate such as orange juice in the source 15 which has a Brix of 51.2, which therefore provides a Brix of about 12.8 in the line 44. This is a normal degree of sweetness for reconstituted orange juice. However, as ice is formed in the chamber 43, the sugar that was in solution with the portion becoming frozen separates therefrom so that pure ice is formed and such sugar goes into solution with the remaining liquid portion, thereby rendering it sweeter.

Nitrous oxide gas provides the pressure in the blender and storage device 13 and transfers that pressure hydrostatically to the chamber 43. Some such gas dissolves in the liquid in the blending and storage device 13, and the dissolved gas leaves the portion of the liquid being frozen in the chamber 43 to become absorbed by the remaining liquid portion which can now take on additional gas since it has a lower temperature than the blending and storage device 13. The solution of the nitrous oxide gas with the liquid portion in the chamber 43 is highly unstable and so that upon discharge to atmospheric pressure, as aided by an agitating type of dispensing, the gas immediately breaks out of the product, thereby fluffing it up or whipping it to make the semi-frozen comestible light and fluffy.

It is thus seen that the apparatus described incorporates a process for dispensing a semi-frozen comestible, made from an unfrozen concentrate of the comestible containing sugar, for example, concentrated natural fruit juice such as orange juice. The process thus includes providing an unfrozen quantity of the concentrated comestible at atmospheric pressure, providing a quantity of pressurized food-grade of water-soluble gas such as nitrous oxide, and providing a separate quantity of water under pressure. The process includes the step of admixing i.e. combining some of the concentrated comestible, some of the food-grade of gas and some of the water in a selected proportion, such as a 1 to 4 ratio under a gas pressure on the order of 30 psig. Such admixing is effected by pressurizing the water supply to a pressure level somewhat above such 30 psig so that the water can enter the blending and storage device 13, and likewise involves pressurizing the concentrate to a corresponding degree. During such pressurizing of the concentrate and the water, the concentrate is metered and the rate of flow of the water is regulated to provide the desired degree of dilution. After such admixing is automatically carried out, the same is stored in the bleeding and storage device 13, and then in response to each serving withdrawn through the dispensing valve 46, a corresponding volume of the mixture is transferred hydrostatically to the chamber 43 automatically under the influence of the gas pressure in the blending and storage device 13. After the temperature in the chamber 43 has been lowered sufficiently to form a predetermined proportion of pure ice, a serving of the semi-frozen comestible is dispensed from the freezing chamber 43 through the dispensing valve 46 to the atmosphere at which time the dissolved nitrous oxide gas breaks out of the liquid portion to render the comestible fluffy. If the product is too fluffy, the flavor tends to fade away or to be too weak, and also, the fluffiness is apt to collapse. The degree of fluffiness can be decreased by lowering the setting on the gas regulator valve 27 or by lowering the percentage of ice formed by adjusting the drag control switch 50.

It is considered preferable to employ the two refrigeration systems 37 and 51. One reason for this is that there is a substantial difference in the amount of refrigeration capacity needed. By way of example, the refrigeration system 51 for one cylinder 43 and one precool plate 24 typically has a 2-horsepower capacity while the refrigeration system 37 typically has only 4 or 5 percent of that capacity. By using a small refrigeration system 37, the likelihood of freezing that portion of the line 25 that is in the chamber 36 is minimized.

By use of the metering pump 32, it is possible to accurately control the flow of a rather heavy syrup, and the source 15 of such concentrate does not need pressurization for dispensing, thereby facilitating the addition of concentrate thereto without interfering with any of the pressurized portions of the system.

There is considerable turbulence in the blending and storage device 13 when it is being refilled, whereby the liquid takes on a maximum amount of the nitrous oxide gas. During any subsequent static period, as when little or no dispensing is taking place, the tendency for the mixture to take additional gas, if any, continually decreases, and thus overnight storage does not provide a problem. By use of the refrigeration system 37, the unfrozen concentrate in the source 15 and the reconstituted mixture in the blending and storage device 13 have excellent keeping qualities. Citrus pulp does not accumulate anywhere in this system and therefore the cleaning interval does not need to be as often as daily.

To comply with the requirement that a preferred embodiment of the invention be disclosed, specific and general examples have been given, for instance, "concentrate of comestible containing sugar, for example, concentrated natural fruit juice such as orange juice". Orange juice is specifically listed not in a restrictive sense, but merely in an economic sense in that it is the most popular juice on the market. Other citrus juices fall equally within the scope of the teaching herein as do other juices which contain natural sugar. The term "concentrated" has been used herein, it being a known fact that the most common degree of concentration for commercially available fruit juice is such that the user adds three cans of water to each can of frozen concentrate to get the desired dilution. Thus where four parts of water are suggested herein, that teaching means that the concentrated juice should be diluted a little more than is customary so that as ice particles are frozen out, the liquid phase gradually takes on the concentration or dilution that the public is accustomed to. Therefore, the dilution of four parts of water suggested herein is exemplary and based on commercial strengths of concentrated fruit juice such as that sold in a frozen state.

As explained above, the concentrated juice is metered volumetrically for a given time period and during this same time period, a flow of water is separately regulated as by means of the flow control 21. The upstream pressure of the flow control 21 minus the downstream pressure at its outlet is irrelevant just so that the upstream pressure is enough to make the device operate, namely to control a constant rate of flow independent of higher variations in upstream pressure. The actual pressures are not otherwise critical and will depend in part upon the pressure drops contained in the line 23 and within the storage device 13.

The values given are thus exemplary to show values that are clearly operative and are not in any sense considered to be critical, as might be the case if this were a chemical process where in fact the process is purely mechanical having no critical values.

Although various minor modifications might be made or suggested by those versed in the art, it should be understood that I wish to embody within the scope of the patent warranted hereon, all such embodiments as reasonably and properly come within the scope of my contribution to the art.

I claim:

1. A process for producing and dispensing a semi-frozen comestible, comprising:
   a. providing an unfrozen quantity of concentrated natural fruit juice;
   b. storing said concentrated juice under refrigeration;
   c. providing a quantity of pressurized nitrous oxide gas;
   d. providing a quantity of water separate from said juice;
   e. metering the concentrated juice while simultaneously separately regulating a flow of said water, and thereafter combining the metered juice and the flow-regulated water in an atmosphere charged with nitrous oxide gas under regulated pressure;
   f. storing the resulting mixture under said regulated pressure of said gas under refrigerated non-freezing conditions;
   g. transferring a portion of the stored mixture to a separate freezing chamber in response to the regulated pressure on the stored mixture;
   h. lowering the temperature of said portion so as to freeze a predetermined proportion thereof under said regulated pressure as pure frozen water crystals dispersed in the unfrozen mixture; and
   j. dispensing a serving of the comestible from said freezing chamber to atmospheric pressure to enable the dissolved nitrous oxide to break out of the liquid portion of the serving to render the serving fluffy.

2. A process according to claim 1 in which said separate quantity of water is refrigerated.

3. A process according to claim 1 in which said metering also raises the pressure on the metered concentrated juice.

4. A process according to claim 1 in which said water is pressurized before its flow is regulated.

5. A pressure according to claim 1 in which said first named atmosphere is refrigerated.

* * * * *